(12) United States Patent
Wang et al.

(10) Patent No.: US 12,381,220 B2
(45) Date of Patent: Aug. 5, 2025

(54) METHODS FOR PREPARING CoNi—S@3D-C NANOCOMPOSITE AND MODIFIED BATTERY SEPARATOR

(71) Applicant: NANJING TECH UNIVERSITY, Nanjing (CN)

(72) Inventors: Zhirong Wang, Nanjing (CN); Yanan Wei, Nanjing (CN); Junling Wang, Nanjing (CN)

( * ) Notice: Subject to any disclaimer, the term of this patent is extended or adjusted under 35 U.S.C. 154(b) by 0 days.

(21) Appl. No.: 18/201,678

(22) Filed: May 24, 2023

(65) Prior Publication Data
US 2024/0396040 A1  Nov. 28, 2024

(51) Int. Cl.
| | |
|---|---|
| *H01M 4/04* | (2006.01) |
| *C01G 53/82* | (2025.01) |
| *H01M 4/36* | (2006.01) |
| *H01M 4/58* | (2010.01) |
| *H01M 4/583* | (2010.01) |
| *H01M 4/62* | (2006.01) |
| *H01M 10/42* | (2006.01) |
| *H01M 50/403* | (2021.01) |
| *H01M 50/417* | (2021.01) |
| *H01M 50/431* | (2021.01) |
| *H01M 50/446* | (2021.01) |
| *H01M 50/451* | (2021.01) |
| *H01M 50/46* | (2021.01) |

(52) U.S. Cl.
CPC .......... *H01M 4/5815* (2013.01); *C01G 53/82* (2025.01); *H01M 4/366* (2013.01); *H01M 4/583* (2013.01); *H01M 4/623* (2013.01); *H01M 4/625* (2013.01); *H01M 10/4235* (2013.01); *H01M 50/403* (2021.01); *H01M 50/417* (2021.01); *H01M 50/431* (2021.01); *H01M 50/446* (2021.01); *H01M 50/451* (2021.01); *H01M 50/46* (2021.01); *C01P 2002/52* (2013.01); *C01P 2002/72* (2013.01); *C01P 2002/85* (2013.01); *C01P 2004/03* (2013.01); *C01P 2004/80* (2013.01); *C01P 2006/40* (2013.01)

(58) Field of Classification Search
CPC ..................................................... H01M 4/04
See application file for complete search history.

*Primary Examiner* — Austin Murata
(74) *Attorney, Agent, or Firm* — Shen Huang

(57) ABSTRACT

Disclosed in the present invention are methods for preparing a CoNi—S@3D-C nanocomposite and a modified battery separator. The CoNi—S@3D-C material synthesized by the method of the present invention is applicable not only to a lithium-ion battery but also to a sodium-ion battery. As the anode for both the lithium-ion and sodium-ion batteries, it exhibits good energy storage performance, maintaining very stable performance even under high-density current charging and discharging cycles, while also possessing very high reversible capacity. The heteroatom-doped three-dimensional nanocarbon structure achieves good encapsulation of the metal sulfides, and can effectively inhibit the volume expansion of the metal sulfides, slowing down the decline of its specific capacity and maintaining the high capacity and service life of the anode material. The CoNi—S@3D-C material of the present invention can also be used as a material for modifying a separator of a lithium-sulfur battery. The modified separator can improve the safety performance of the lithium-sulfur battery while maintaining a high energy storage effect of the battery and slowing down the capacity decline of the lithium-sulfur battery.

4 Claims, 6 Drawing Sheets

METHODS FOR PREPARING CoNi—S@3D-C NANOCOMPOSITE AND MODIFIED BATTERY SEPARATOR

TECHNICAL FIELD

The present invention relates to the technical field of battery electrode materials, and in particular to methods for preparing a CoNi—S@3D-C nanocomposite and modified battery separator.

BACKGROUND ART

Conventional transition metal sulfides have the problems of low conductivity and large volume expansion rate of transition metal sulfides during charge and discharge as the anodes for lithium-ion batteries (LiBs) and sodium-ion batteries (SiBs). Because the sodium-ion radius is larger than the lithium-ion radius, the application of anode materials in sodium-ion batteries is more difficult among the application of anode materials.

In CN201610119213.5, the title of which is "method for preparing biomass-based hollow carbon micro-tube/nickel-cobalt metal sulfides composite electrode material", biomass willow catkin is used as a carbon source to generate a carbon tube structure by using an inert gas plus high-temperature carbonization, then the biomass carbon tube structure is added into a mixed solution consisting of a transition metal salt and thiourea to prepare a hollow carbon micro-tube/cobalt-nickel metal sulfide composite electrode material by a hydrothermal method. The microstructure formed by a hydrothermal method is tubular, and there are obvious particles on the outside, which are metal sulfides. It can be seen therefrom that the cobalt-nickel metal sulfides merely adhere to the carbon tube and are not encapsulated in the carbon tube, with many sulfides exposed to the outside. However, lithium-ions and sodium-ions are intercalated and deintercalated on the anode material during the charge-discharge cycle of the battery. This process will lead to rapid volume expansion of the metal sulfides and eventually lead to structural damage. Especially, the sodium ions themselves have a larger radius than lithium ions, so it is easier to expand the volume of the transition metal sulfides due to the intercalation and deintercalation of sodium ions. Therefore, if there is no special carbon structure to effectively protect sulfides, such problems cannot be solved. In addition, the composite electrode material prepared by the hydrothermal method does not contain doping of heteroatoms on the hollow micrometer carbon structure, while the carbon structure doped with heteroatoms can effectively limit the volume expansion of transition metal sulfides, and make this composite material have better electron transfer effects and energy storage properties.

In CN201710235593.3, the title of which is "method for preparing controllable nitrogen-doped carbon nanotube", an anode material for a sodium-ion battery is proposed, wherein the anode material has a heteroatom-doped carbon nanotube structure. Cobalt salt and nickel salt are added in the preparation process, and citric acid or sucrose, or glucose is used as a carbon source. The substances such as citric acid, sucrose, or glucose cannot form a special structure like carbon nanotubes by common high-temperature calcination. Therefore, cobalt salt and nickel salt are added in the preparation process to perform high-temperature calcination in coordination with urea. The cobalt salt and nickel salt are used as catalysts, and the urea provides nitrogen elements. Then excess metals or metal sulfides are corroded away to finally form pure nitrogen-doped carbon nanotubes. The capacity exhibited by such carbon nanotubes as anode materials for sodium-ion batteries is much lower than the capacity of metal sulfides as anodes because the theoretical capacity of carbon is 370 mAh/g and the capacity of carbon materials as anode materials does not exceed this value. Even if heteroatom doping is used to increase the surface activity of carbon nanotubes, they exhibit a capacity of only 250 mAh/g as anode materials for sodium-ion batteries.

In application No. CN201911040191.3, the title of which is "method for preparing carbon nanotube from coal", a method for preparing a carbon nanotube from coal is proposed, wherein the preparation process comprises: mixing the pulverized coal with water, melamine, and a soluble cobalt salt or nickel salt, and then performing wet-milling by a high-energy ball mill to obtain a slurry mixture; and subjecting the mixture to freeze-drying to obtain porous blocks. Clustered carbon nanotubes can be prepared by sintering the blocks in a high-temperature atmosphere furnace in a mixed hydrogen/argon atmosphere, and finally, relatively pure carbon nanotubes can be obtained by acid washing and water washing. This method is very similar to the solution described in application No. CN201710235593.3, in which, carbon nanotubes are also prepared using the catalytic action of a cobalt salt or a nickel salt.

SUMMARY OF THE INVENTION

An object of the present invention is to overcome the technical problems in the prior art of volume expansion of transition metal sulfides and the low capacity of general carbon materials as anode materials during charge and discharge. Another object of the present invention is to solve the problem that the conventional Celgard2325 commercial separator cannot maintain the high capacity of lithium-sulfur batteries and satisfy the safety of lithium-sulfur batteries.

In order to achieve the above object, the present invention adopts the following technical scheme: A method for preparing a CoNi—S@3D-C nanocomposite comprising: dissolving cobalt nitrate powder, nickel nitrate powder, and thiourea powder in an ethylene glycol solution and performing a continuous ultrasonic stirring, then adding hexadecyl trimethyl ammonium bromide powder and a glucose solution, and continuing to maintain the ultrasonic stirring; then transferring the above-mentioned solution into a stainless steel autoclave for a hydrothermal reaction, washing the product of the hydrothermal reaction with deionized water and ethanol respectively by centrifugation for 3 times, and then drying overnight; and mixing the dried powder with sulfur powder and thoroughly grinding them, then putting the mixture into a high-temperature resistant porcelain boat, heating with a tube furnace, and insulating under a nitrogen atmosphere to obtain the final product CoNi—S@3D-C.

Cobalt nitrate provides cobalt ions; nickel nitrate provides nickel ions; thiourea provides a sulfur source and a nitrogen source; glucose provides a carbon source; cetyltrimethyl ammonium bromide is used as a surfactant to allow a better binding of sulfur with cobalt ions and nickel ions by means of its coordination property. It can also help glucose to form a three-dimensional nano-carbon structure under high-temperature calcination, thereby more effectively encapsulating the metal sulfides.

The nanocomposite electrode material CoNi—S@3D-C formed in the present invention uses a carbon material as a carrier and uses a carbon structure to encapsulate metal sulfides to form protection. Firstly, glucose ($C_6H_{12}O_6$) is used to provide a carbon source and thiourea ($CH_4N_2S$) is used to dope carbon materials with sulfur and nitrogen heteroatoms in a high temperature-resistant reactor by hydrothermal method. Cetyltrimethyl ammonium bromide (CTAB) is also added in the hydrothermal process. The precursor of the composite is synthesized by the good coordination of the surfactant. Then nitrogen is introduced into the tube furnace and heated with sulfur powder at high temperatures. The carbon was doped with heteroatoms by one-step sulfidation and carbonization. The carbon structure has a three-dimensional shape with more attachment sites. Furthermore, the resulting CoNi—S@3D-C has a good pore structure, which is not only applicable to lithium-ion batteries but also applicable to sodium-ion batteries. That is because such a three-dimensional nano-carbon structure perfectly encapsulates transition metal sulfides. More ion attachment sites can effectively enable lithium ions and sodium ions to complete intercalation and deintercalation during charging and discharging so that when used as an anode material for lithium-ion and sodium-ion batteries, the structure is not damaged due to the volume expansion of sulfides caused by the intercalation and deintercalation of ions during charging and discharging. Thus, high capacity and long life as an anode material for lithium-ion and sodium-ion batteries are ensured.

In addition, the Keesom force action of heteroatom-doped carbon can limit the volume expansion of transition metal sulfides, so that this carbon material has more excellent electron transport effect and energy storage effect due to the doping of nitrogen and sulfur elements, which can slow down the capacity fade of the battery.

Specifically, 0.48 g of cobalt nitrate powder, 0.48 g of nickel nitrate powder, and 0.22 g of thiourea powder are dissolved in 70 ml of ethylene glycol solution and a continuous ultrasonic stirring is performed for 30 minutes. Then 1.4 g of hexadecyl trimethyl ammonium bromide powder and 0.422 g of glucose solution are added and continued to maintain ultrasonic stirring for 30 minutes. Then, the above-mentioned solution is transferred into a stainless steel autoclave for a hydrothermal reaction at 180° C. for 12 hours. The product of the hydrothermal reaction is washed with deionized water and ethanol respectively by centrifugation 3 times and then dried at 80° C. overnight. The 100 mg of dried powder is mixed with 500 mg of sulfur powder and thoroughly ground. Then the mixture is put into a high-temperature resistant porcelain boat, heated with a tube furnace at a heating rate of 3° C./min to 600° C., and insulated under a nitrogen atmosphere for 5 hours to obtain the final product CoNi—S@3D-C.

Preferably, the dried powder and the sulfur powder are mixed in a mass ratio of 1:5 and then sufficiently ground. The dried powder and the sulfur powder are mixed in a mass ratio of 1:2 and 1:3. The prepared product is detected and found not to be completely formed into a sulfide. Therefore, in order to ensure that the sulfide can be formed after high-temperature calcination and also in order not to waste the sulfur powder, the final ratio is preferably 1:5.

Lithium-sulfur batteries (LSBs) have received considerable attention due to their extremely high energy density and theoretical capacity (2600 W h $kg^{-1}$ and 1675 mA h $g^{-1}$). However, LSBs also have some inherent drawbacks, which seriously affect the cycle performance and service life of the battery. For example, soluble polysulfides have severe shuttling behavior that tends to result in the loss of active species. In addition, side reactions between the polysulfides and the lithium anode continually destroy the solid SEI membrane and exacerbate lithium dendrite growth. Over-grown lithium dendrites can puncture separators with low mechanical strength and then cause a short circuit of the battery or even an explosion fire.

A method for modifying a battery separator using a nanocomposite material, wherein CoNi—S@3D-C powder and acetylene black powder, and a polyvinylidene fluoride solution are mixed together; the mixture is dispersed in N-methyl pyrrolidone, and milled into a uniform slurry using an oscillating ball mill; and the milled uniform slurry is coated on the Celgard2325 commercial separator to obtain a modified separator.

Both the Keesom force of heteroatom-doped carbon and the Lewis acid-base effect of transition metal sulfides have excellent chemisorption to polysulfide. At the same time, the transition metal sulfides themselves also have excellent electrocatalytic and can promote the conversion of polysulfides. In addition, the carbon structure has a physical barrier and adsorption effect, and this conductive property contributes to the enhancement of reaction kinetics, which in turn activates "dead sulfur" and "dead lithium", reducing the loss of active species. The experimental results show that the special structure of CoNi—S@3D-C can adsorb polysulfide effectively. Therefore, various problems described above can be solved by modifying a commercial separator with the above functional material to obtain a corresponding modified separator. The results show that the cycle and rate performances of the modified separator are improved obviously.

Specifically, 70 mg of CoNi—S@3D-C powder and 20 mg of acetylene black powder, and 10 mg of polyvinylidene difluoride (PVDF) solution are mixed together; the mixture is dispersed in N-methyl pyrrolidone (NMP), and milled to a uniform slurry using an oscillating ball mill; the milled uniform slurry is coated on the Celgard2325 commercial separator to obtain a modified separator.

Compared with the prior art, the present invention has the following beneficial effects: The CoNi—S@3D-C material synthesized by the method of the present invention is not only applicable to lithium-ion batteries but also applicable to sodium-ion batteries. As the anode of both the lithium-ion battery and sodium-ion battery, it exhibits a good energy storage effect. Compared with the solution of application No. CN201710235593.3, it can maintain very stable performance even under high-density current charging and discharging cycles, while also possessing very high reversible capacity. In addition, the heteroatom-doped three-dimensional nanocarbon structure prepared by the method of the present invention achieves good encapsulation of the metal sulfides. Compared with the solution of application No. CN201610119213.5, the anode material prepared by the present invention can effectively inhibit the volume expansion of the metal sulfides, slowing down the decline of its specific capacity and maintaining the high capacity and service life of the anode material.

The CoNi—S@3D-C material prepared by the method of the present invention can also be used as a material for modifying a separator of a lithium-sulfur battery. The modified separator can improve the safety performance of the lithium-sulfur battery while maintaining a high energy storage effect of the battery and slowing down the capacity decline of the lithium-sulfur battery.

BRIEF DESCRIPTION OF THE DRAWINGS

FIG. 2(a) and FIG. 2(b) show the results of XRD and XPS test analysis on CoNi—S@3D-C, wherein FIG. 2(a) is an XRD spectrum and FIG. 2(b) is an XPS spectrum;

FIG. 3(a) and FIG. 3(b) are an electrode prepared from CoNi—S@C; wherein FIG. 3(a) is the front surface of the electrode, and FIG. 3(b) is the back surface of the electrode;

FIGS. 4(a)-4(f) is a result of performance tests of a lithium-ion battery and a sodium-ion battery prepared in Example 3, wherein FIG. 4(a) is the capacity of a lithium battery to be cycled for 100 cycles at a current density of 0.3 A/g; FIG. 4(b) is the capacity of a lithium battery at different rates; FIG. 4(c) is the capacity of a sodium battery to be cycled for 100 cycles at a current density of 0.3 A/g; FIG. 4(d) is the capacity of a sodium battery at different rates; FIG. 4(e) is the capacity of a lithium battery to be cycled for 100 cycles at a current density of 1 A/g; and FIG. 4(f) is the capacity of a sodium battery to be cycled for 80 cycles at a current density of 1 A/g; and FIG. 5(a) and FIG. 5(b) shows the results of the performance test of a lithium-sulfur battery equipped with a modified separator of Example 5, wherein FIG. 5(a) is the capacity of a CoNi—S@3D-C modified separator-equipped lithium-sulfur battery cycled to be cycled for 100 cycles at a current density of 1 A g$^{-1}$ and FIG. 5(b) shows the capacities at different current densities.

DETAILED DESCRIPTION OF THE INVENTION

The following is a further detailed description of the specific embodiments of the present invention in conjunction with the accompanying drawings and examples of the description. It should be understood that the specific embodiments described here are only intended to illustrate and explain the present invention and are not intended to limit it.

Example 1 Preparation of CoNi—S@3D-C Nanocomposite 0.48 g of cobalt nitrate powder and 0.48 g of nickel nitrate powder, and 0.22 g of thiourea ($CH_4N_2S$) powder were dissolved in 70 ml of ethylene glycol solution with ultrasonic stirring, and ultrasonic stirring was continued for 30 minutes. Then, 1.4 g of hexadecyl trimethyl ammonium bromide (CATB) powder and 0.422 g of glucose ($C_6H_{12}O_6$) solution were added, and ultrasonic stirring was continued for 30 minutes. Then, the above-mentioned solution was transferred into a stainless steel autoclave for a hydrothermal reaction at 180° C. for 12 hours. The product was washed with deionized water and ethanol respectively by centrifugation 3 times and then dried at 80° C. overnight. The dried powder was mixed with sulfur powder in a mass ratio of 1:5 (product 100 mg:sulfur powder 500 mg) and thoroughly ground after mixing. Then the mixture was put into a high-temperature resistant porcelain boat, heated with a tube furnace at a heating rate of 3° C./min to 600° C., and insulated under a nitrogen atmosphere for 5 hours to obtain the final product CoNi—S@3D-C.

Figure 1:
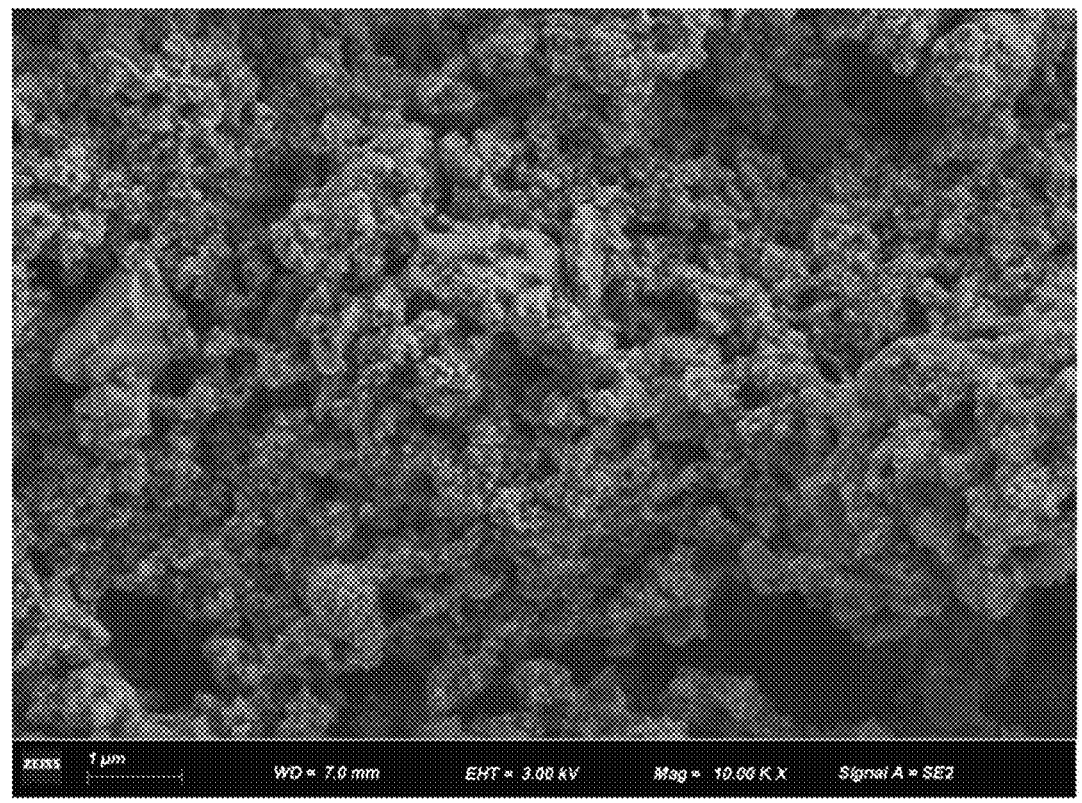
FIG. 1 shows the SEM structure of the CoNi—S@3D-C material under scanning electron microscopy.

Through the scanning electron microscope photograph of CoNi—S@3D-C and the test on the element distribution of S, Co, Ni, and C, as shown in FIG. 1, it can be seen that after high-temperature calcination under nitrogen, the carbon material can well encapsulate Ni and Co sulfides, and the material is successfully doped with N and S using thiourea.

Figures 2, 2A:
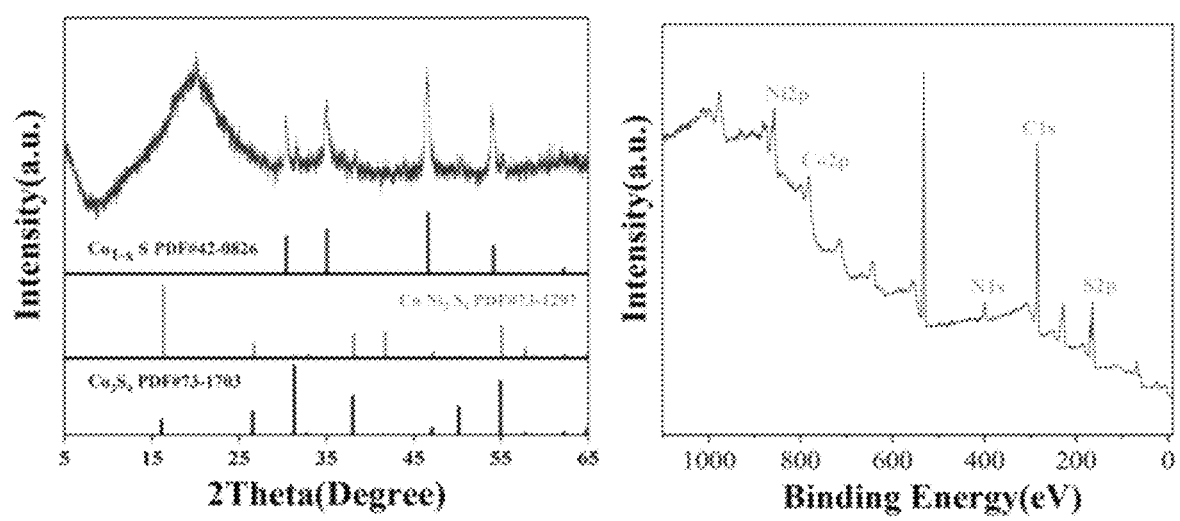

Through XRD and XPS test analysis on CoNi—S@3D-C, as shown in FIG. 2(a) and FIG. 2(b), it can be seen that both transition metals form polysulfides well during high-temperature vulcanization. The peaks of the N element and S element were detected through the XPS test, which further indicated that the doping of these two elements is very successful.

Figure 3A:
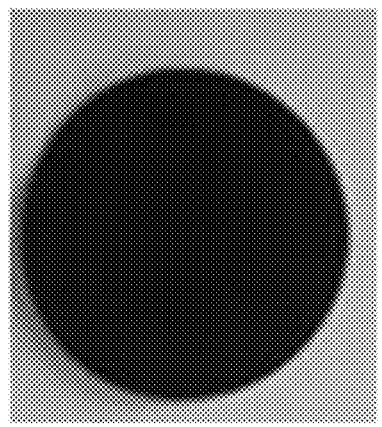
Figure 3:
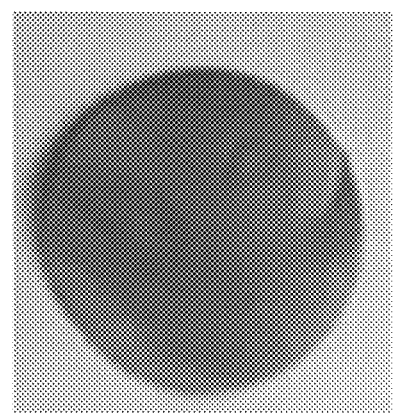

Example 2 Preparation of Electrodes 70 mg of CoNi—S@3D-C powder and 20 mg of acetylene black powder and 10 mg of polyvinylidene fluoride (PVDF) solution were mixed together. The mixture was dispersed in N-methyl pyrrolidone (NMP), ground to a uniform slurry with an agate mortar, and then uniformly coated on a copper foil. The coated copper foil was then dried in a vacuum oven at a temperature of 70° C. for 12 hours and cut into electrodes having a radius of 6 mm as shown in FIGS. 3(a) and 3(b), wherein FIG. 3(a) is the front side of the electrode and FIG. 3(b) is the back side of the electrode.

Example 3 Preparation of Lithium-Ion Cells and Sodium-Ion Cells

Figure 4A:
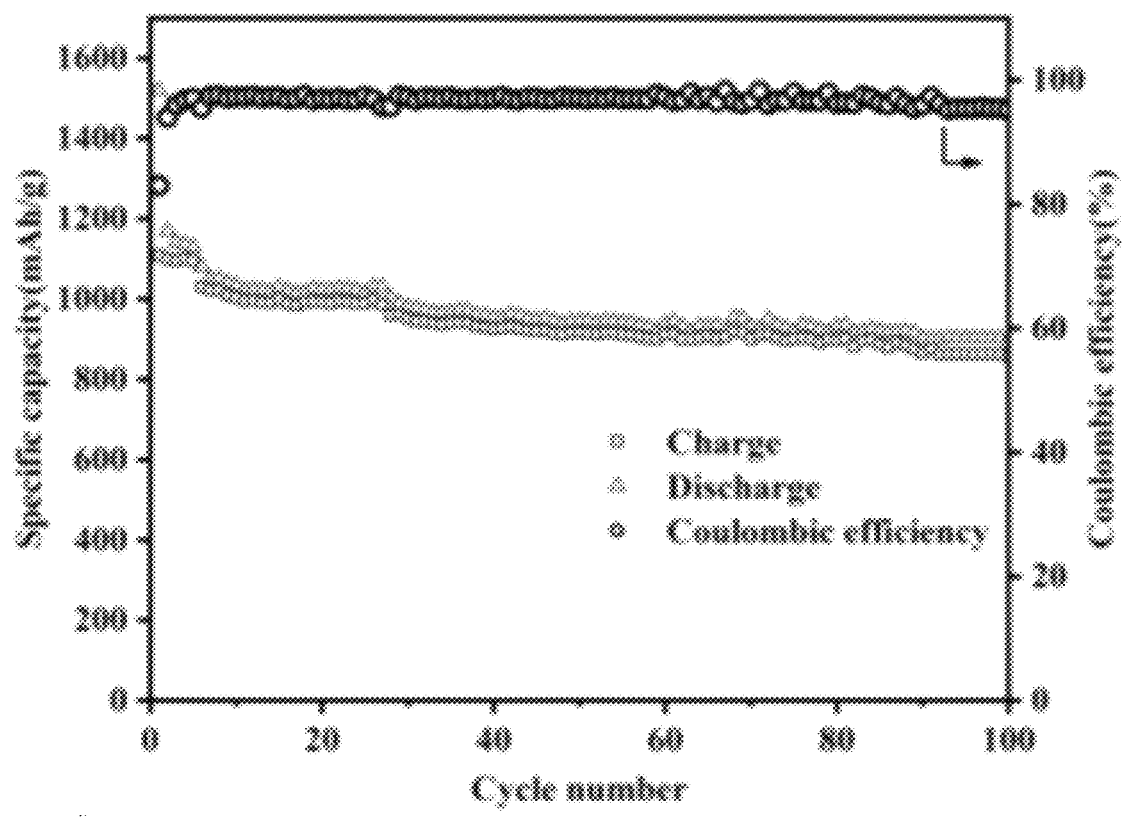
Figure 4B:
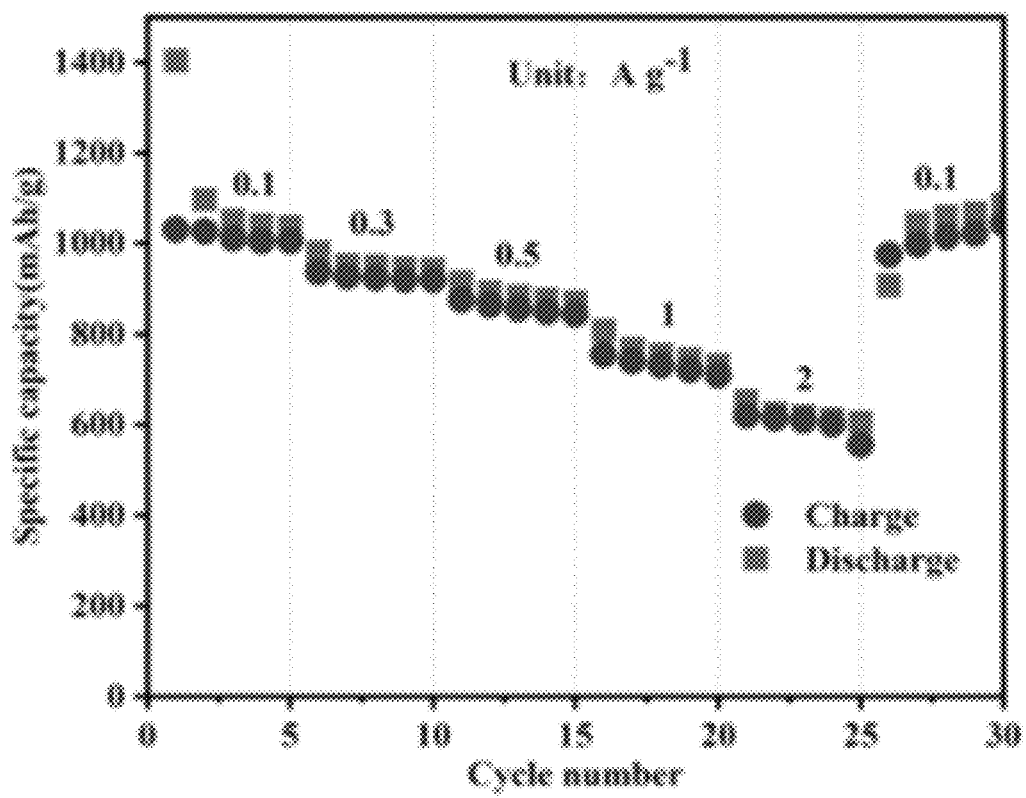
Figure 4C:
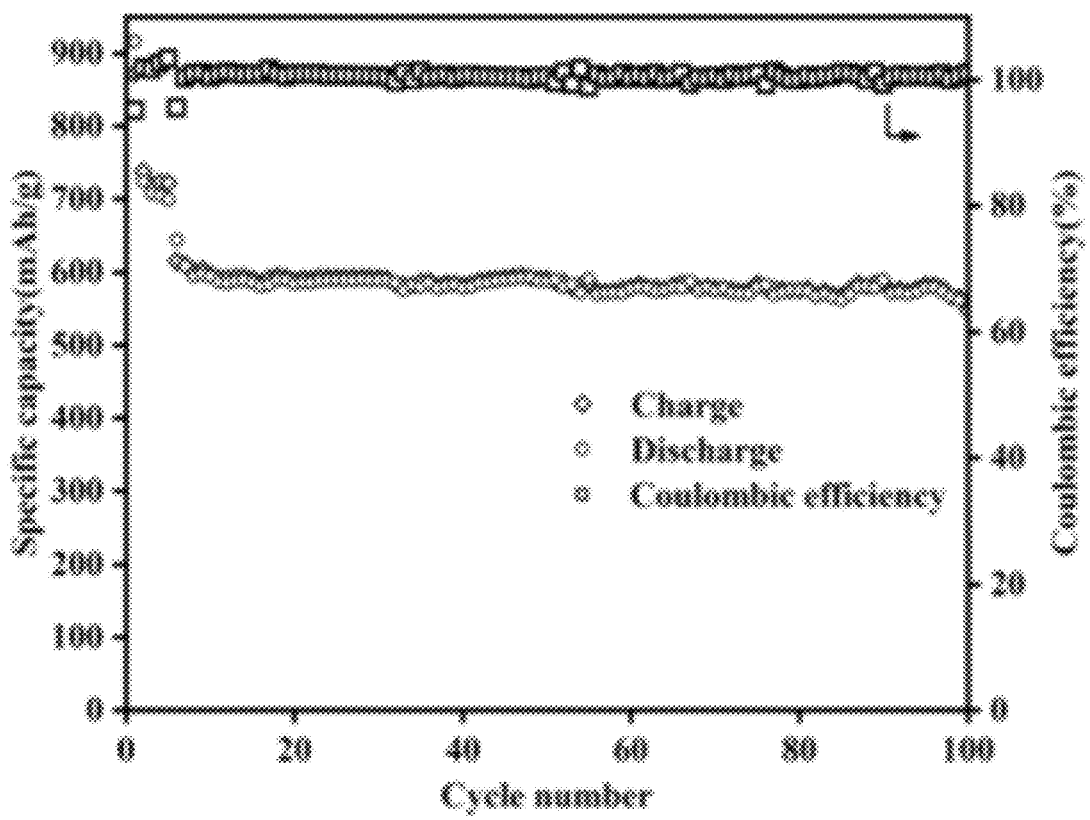
Figure 4D:
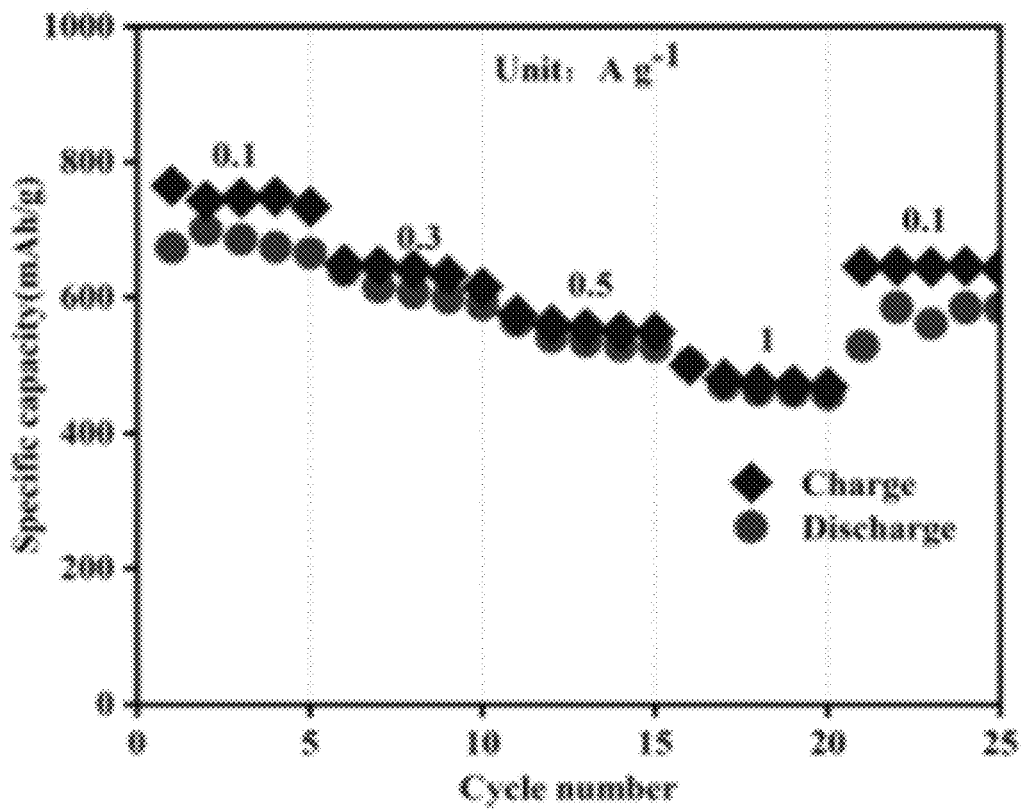

Two button cells, a lithium-ion cell, and a sodium-ion cell, were assembled in a glove box using metallic lithium and metallic sodium as positive electrodes and the electrodes obtained in Example 2 as negative electrodes, respectively, and the Celgard2325 as commercial separators. The lithium-ion cell was added with 60 µl of electrolyte, and the lithium-ion cell used a secondary electrolyte (LB-008). The sodium-ion cell was added with 80 microliters of electrolyte, and the sodium-ion cell used sodium trifluoromethyl sulfonate electrolyte (NS-001). The discharge capacities of the two cells were measured at the current densities of 100, 300, 500, 1000, and 2000 mA/g, respectively, as shown in FIGS. 4(b) and 4(d), which respectively show that the discharge capacities of the lithium-ion cell were 1096, 980, 891, 768 and 618 mAh/g at the current densities of 100, 300, 500, 1000 and 2000 mA/g, and the discharge capacities of the sodium-ion cell were 699, 607, 535 and 463 mAh/g at the current densities of 100, 300, 500 and 1000 mA/g.

The lithium-ion cell had a high capacity of 1059 mAh/g when the tested current density was reset to 100 mA/g after the lithium-ion cell was tested for multiple cycles between the current density range of 100 mA/g to 2000 mA/g; the sodium-ion cell had a high capacity of 585 mAh/g when the tested current density was reset to 100 mA/g after the sodium-ion cell was tested for multiple cycles between the current density range of 100 mA/g to 1000 mA/g, demonstrating the superiority of the prepared nanocomposite CoNi—S@3D-C.

Two cells were cycled for 100 cycles at a current density of 300 mA/g. As shown in FIGS. 4(a) and 4(c), both cells not only can exhibit strong stability and ultra-high Coulombic efficiency, but also maintain high reversible discharge capacities of 900 mAh/g and 600 mAh/g.

Figure 4E:
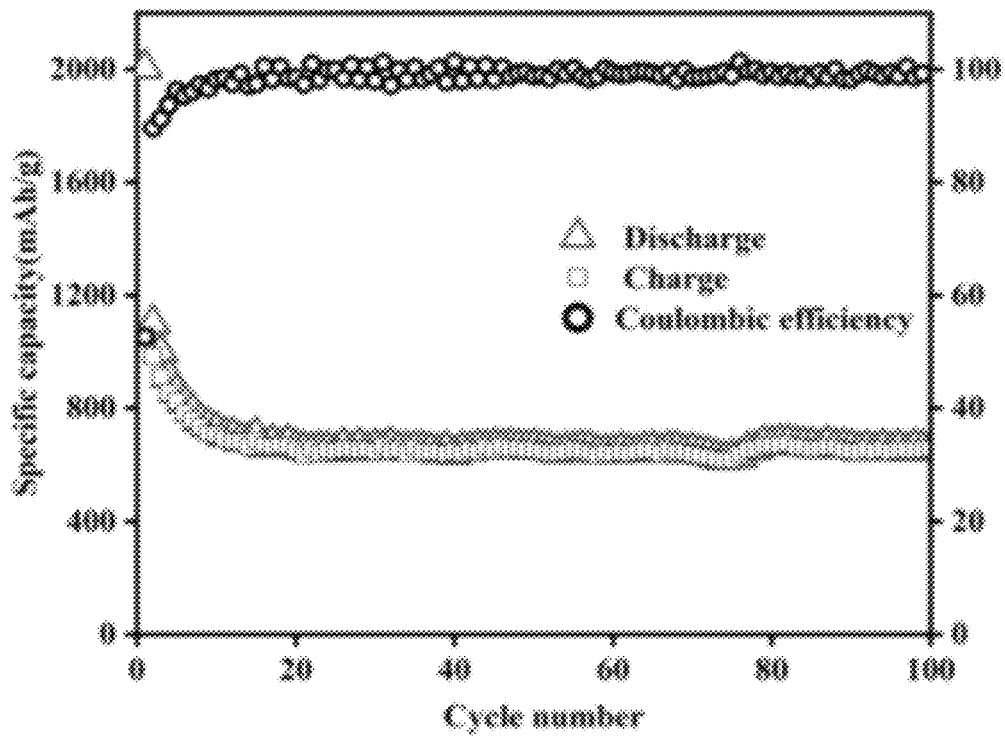
Figure 4F:
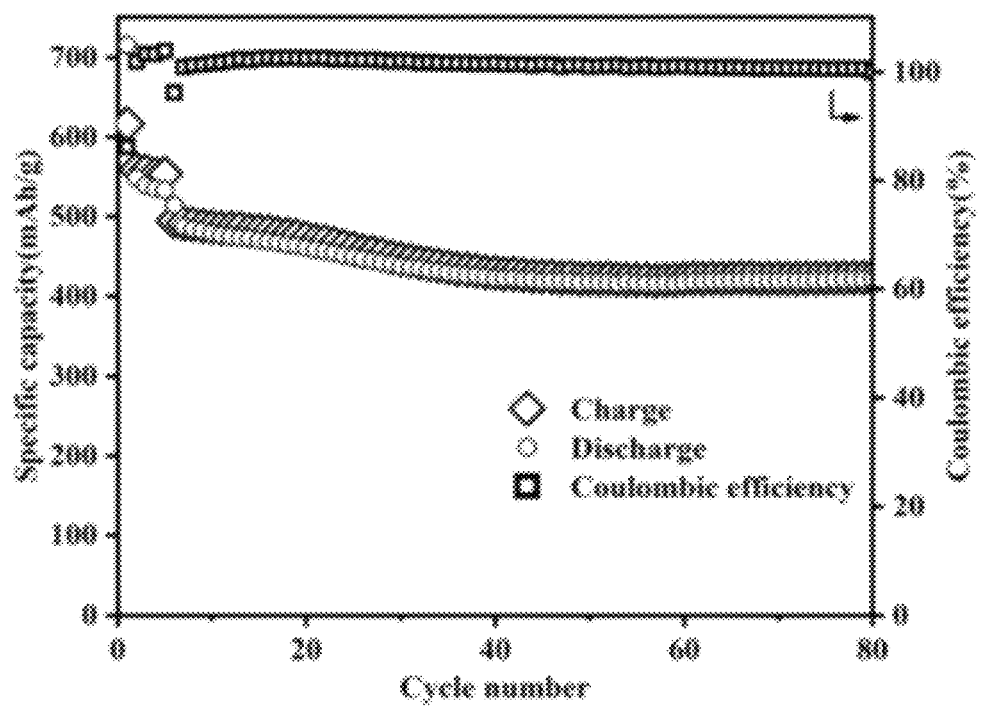

Two cells were cycled for 100 cycles at a current density of 1000 mA/g. As shown in FIGS. 4(e) and 4(f), they can maintain high discharge capacities of 650 mAh/g and 450 mAh/g, respectively, and the Coulombic efficiency is close to 100%, greatly improving the capacity retention rate of the lithium-ion cell and the sodium-ion cell.

Example 4 Separator Modification

An ordinary commercial separator was modified with CoNi—S@3D-C to obtain a new separator. The specific method is as follows: 70 mg of CoNi—S@3D-C powder, 20 mg of acetylene black powder, and 10 mg of polyvinylidene difluoride (PVDF) solution were mixed together. The mixture was dispersed in N-methyl pyrrolidone (NMP) and milled into a uniform slurry using an oscillating ball mill. The milled uniform slurry was coated on the Celgard2325 commercial separator to obtain a modified separator. The performances of the modified separator and the Celgard2325 commercial separator in porosity, electrolyte adsorption rate, and self-extinguishing time were compared. The results are as follows:

Compared with the Celgard2325 commercial separator, the porosity of the modified separator increased from 49.8% to 191.2%; the electrolyte adsorption rate of the modified separator increased from 61.5% of the Celgard2325 commercial separator to 310.4%; the self-extinguishing time decreased from 2.35 seconds of the Celgard2325 commercial separator to 0.136 seconds, which fully demonstrated that CoNi—S@3D-C as a modified material of the Celgard2325 commercial separator has quite superior properties.

Example 5

The modified separator obtained in Example 4 was punched into a separator having a diameter of 17 mm and used to assembly a lithium-sulfur battery, and the assembly of the battery was completed in a glove box. The lithium-sulfur battery was added with 60 μL of electrolyte, and the electrolyte used for the lithium-sulfur battery was lithium-sulfur electrolyte (LS-002).

Figure 5A:
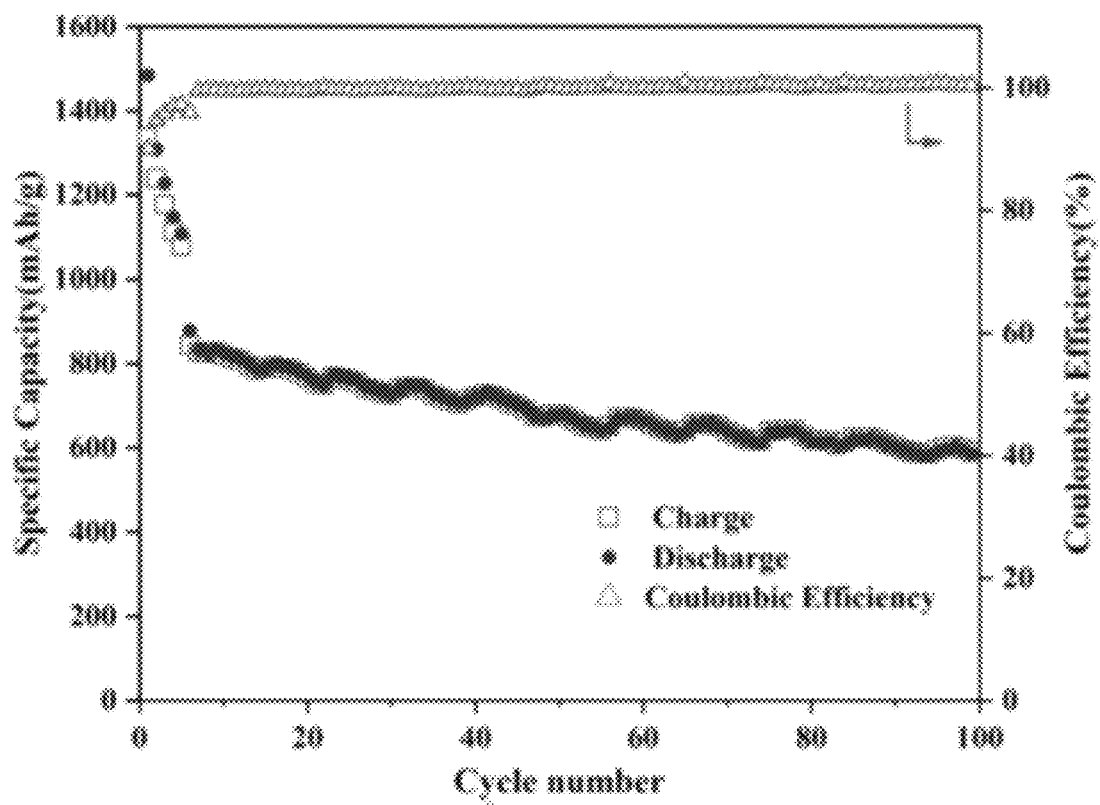
Figure 5B:
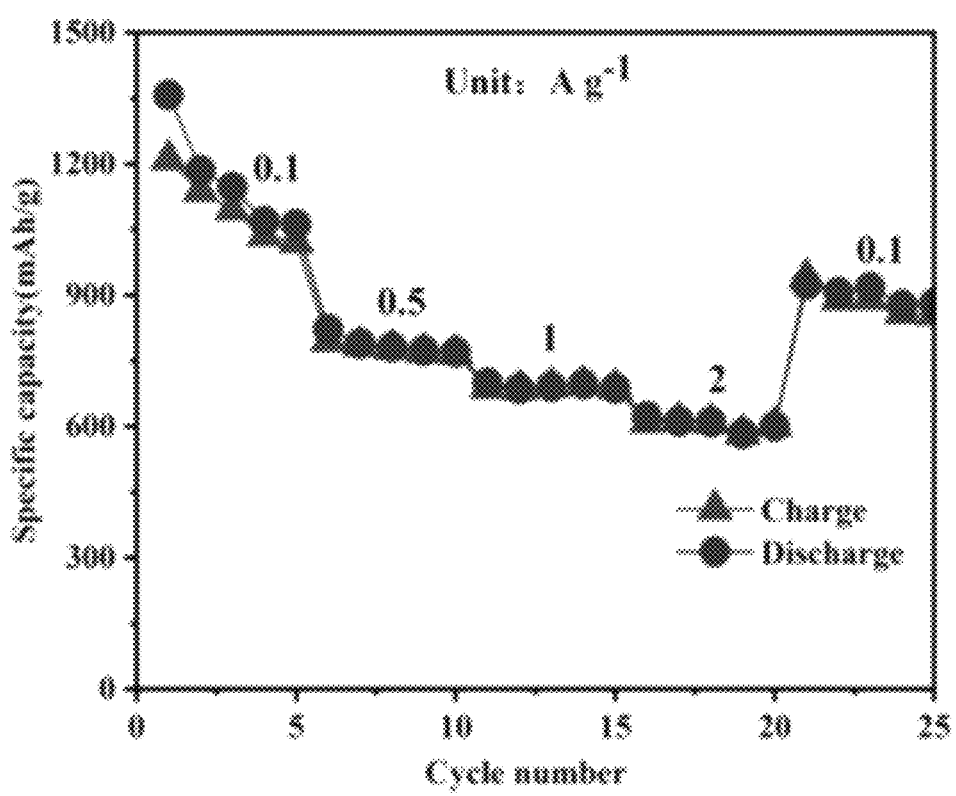

The modified separator of this example was used to assembly a lithium-sulfur battery to test cycle performance, with an initial discharge capacity as high as 1484.6 mAh/g at 100 mAh/g and a capacity of 590 mAh/g after 100 cycles at a high current density of 1000 mAh/g, the Coulombic efficiency remaining 100% throughout, as shown in FIG. 5(a). The rate performance of lithium-sulfur cells equipped with the modified separator of this example at different current densities are as shown in FIG. 5 (b). The discharge capacities were 1357, 822, 699, and 612 mAh/g at current densities of 100, 500, 1000, and 2000 mA/g, respectively, the capacity of the lithium-sulfur battery can also recover to a high capacity of 923 mAh/g when the tested current densities were reset to 100 mA/g.

The specific embodiments of the present invention that are not involved in the description belong to well-known techniques in the art and can be implemented with reference to well-known techniques. The above are only the preferred embodiments of the present invention. It should be pointed out that for ordinary technical personnel in this field, several improvements and embellishments can be made without departing from the present invention. These improvements and embellishments should also be considered as the scope of protection of the present invention.

The invention claimed is:

1. A method for preparing a nanocomposite comprising:
   (a) dissolving cobalt nitrate powder, nickel nitrate powder, and thiourea powder in an ethylene glycol solution and performing continuous ultrasonic stirring to form a first solution;
   (b) adding hexadecyl trimethyl ammonium bromide powder and a glucose solution to the first solution and continuing ultrasonic stirring to form a uniform reaction solution;
   (c) transferring the uniform reaction solution into a stainless steel autoclave and performing a hydrothermal reaction to produce a hydrothermal reaction product;
   (d) washing the hydrothermal reaction product sequentially with deionized water and ethanol, each washing step performed by centrifugation and repeated three times;
   (e) drying the washed hydrothermal reaction product at 80° C. for 12 hours to produce a dried powder;
   (f) mixing the dried powder with sulfur powder in a mass ratio of 1:5 and grinding the mixture to form a ground mixture;
   (h) heating the ground mixture in a tube furnace to 600° C. at a heating rate of 3° C./min and maintaining the temperature at 600° C. under a nitrogen atmosphere for 5 hours to obtain the nanocomposite, wherein the nanocomposite comprises cobalt sulfide and nickel sulfide encapsulated within a three-dimensional nanocarbon structure derived from the glucose.

2. The method of claim 1, wherein:
   (a) dissolving cobalt nitrate powder, nickel nitrate powder, and thiourea powder comprises dissolving 0.48 g of cobalt nitrate powder, 0.48 g of nickel nitrate powder, and 0.22 g of thiourea powder in 70 ml of ethylene glycol solution with continuous ultrasonic stirring for 30 minutes;
   (b) then adding 1.4 g of hexadecyl trimethyl ammonium bromide powder and 0.422 g of glucose solution, and continuing ultrasonic stirring for 30 minutes;
   (c) transferring the uniform reaction solution into the stainless steel autoclave and performing the hydrothermal reaction at 180° C. for 12 hours.

3. A method for modifying a battery separator comprising:
   (a) mixing the nanocomposite produced by the method of claim 1, acetylene black powder, and polyvinylidene fluoride solution to form a mixture;
   (b) dispersing the mixture in N-methyl pyrrolidone to form a dispersion;
   (c) performing ball-milling on the dispersion using an oscillating ball mill to obtain a uniform slurry;
   (d) coating the uniform slurry onto a microporous polyolefin separator to obtain a modified separator.

4. The method of claim 3, wherein obtaining the modified separator comprises:
   (a) mixing 70 mg of the nanocomposite, 20 mg of acetylene black powder, and 10 mg of polyvinylidene fluoride (PVDF) solution;
   (b) dispersing the mixture in N-methyl pyrrolidone (NMP);
   (c) ball-milling the dispersion using an oscillating ball mill to form the uniform slurry;
   (d) coating the uniform slurry onto the microporous polyolefin separator to obtain the modified separator.

* * * * *